Feb. 18, 1969  V. J. RYSZEWSKI  3,428,345
JOINT ASSEMBLY FOR VEHICLE STEERING LINKAGE
Filed May 12, 1966
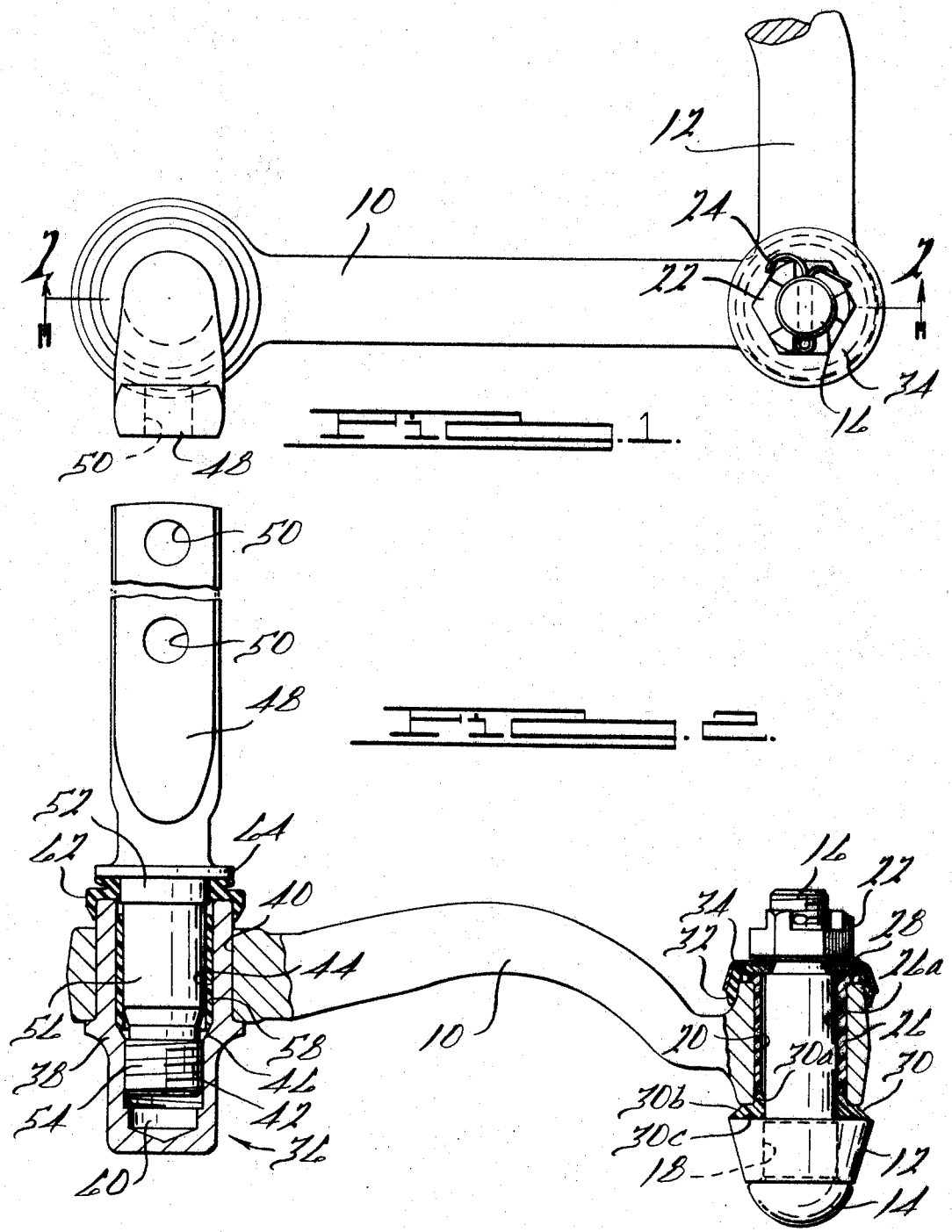
INVENTOR.
Vincent J. Ryszewski
BY
Harness and Harris
ATTORNEYS.

United States Patent Office 3,428,345
Patented Feb. 18, 1969

3,428,345
JOINT ASSEMBLY FOR VEHICLE STEERING LINKAGE
Vincent J. Ryszewski, Detroit, Mich., assignor to Chrysler Corporation, Highland Park, Mich., a corporation of Delaware
Filed May 12, 1966, Ser. No. 549,699
U.S. Cl. 287—93                2 Claims
Int. Cl. F16b *31/00;* F16d *1/00*

ABSTRACT OF THE DISCLOSURE

A joint assembly for interconnecting two components one of which is rotatable to the other. The joint components are threadedly interconnected for easy rotative movement at constant torque, and, axially spaced from the cooperating threads, each component is provided with a cooperating bearing portion for relieving the threads of stress and resisting conical deflection.

---

This invention relates to the steering system of automobiles and the like and more particularly to vehicle idler arm assemblies.

Currently, most automotive vehicles are equipped with a parallelogram linkage steering system in which the cross or center link is moved longitudinally by a pitman arm which is in turn operatively connected to the steering column. This longitudinal shifting of the center link effects turning or pivoting of the vehicle wheels by means of tie rods which connect the center link with the steering arms of the wheels. Accordingly, it is most important in the interest of steering control and safety, as well as imparting a desirable steering "feel," that the center link move smoothly and easily. Therefore, to facilitate such movement an idler arm is employed to guide and carry the center link along a predetermined path resulting from the motion imparted thereto by the manually controlled pitman arm. The idler arm has one end portion which is pivotally supported by the vehicle frame or chassis and a second end portion which carries and guides the center link, and, if the idler arm is to fully accomplish its function, it must be capable of repeatedly pivoting through a given angle with as little deviation as possible from a predetermined path. Naturally, such a requirement imposes seemingly conflicting demands upon the joint assembly which enables the idler arm to pivot. Thus, the operation of the joint should only require the application of a low and constant torque so as to provide for ease of steering. On the other hand, the joint must be sufficiently rigid so as not to permit angular or conical deflection of the idler arm which would create erratic steering. In addition, the joint assembly must be sufficiently economical to permit its incorporation in a mass-produced item and must be capable of being installed in a minimum of time as on an assembly line.

It is therefore a principal object of this invention to provide a new and improved joint assembly which substantially prevents conical deflection of the associated parts of the joint while permitting their free rotation.

Another object of this invention is to provide a joint assembly for a steering linkage which will transmit steering movements under low torque and at the same time a torque which is constant throughout the pivotal movement of the joint components.

Another object of this invention lies in the provision of a novel joint for automotive steering linkages which is constructed of a minimum number of parts and may be readily assembled at relatively low cost.

Yet another object is to provide a new and improved joint construction for supporting an idler arm which can be permanently lubricated and completely sealed.

According to the present invention, a pivot joint is provided which is composed of cooperating housing and stud members which are securely and yet easily interconnected. The stud member includes an externally threaded stem or shank, and the housing is provided with an internally threaded bore which cooperatively receives therein the threaded stud. This threaded construction of the two components of the joint has many advantages. Thus, the components can be quickly and easily assembled while at the same time providing a connection which is extremely reliable from a safety standpoint since normal service will not cause simultaneous failure of all the threads so as to permit sudden separation of the joint components. Moreover, the screw threaded connection inherently provides for ease of rotation as between the joint components, and just as importantly, the torque required to rotate the joint components with respect to each other is essentially constant throughout the angle of rotation. In addition to being threadedly interconnected, the joint of this invention is constructed so that the components thereof are provided with cooperating bearing surfaces. This is most important since in systems in which the joint components are subject to frequent pivotal movement, the cooperating screw threads are constantly working and, in the absence of such bearing surfaces as contemplated in this invention, would bear the full stress placed on the joint. Naturally, such a condition would quickly wear the threads to such an extent that the joint would have to be repaired or replaced. However, the bearing surfaces in the joint of this invention relieve the threads of much stress and, hence, provide for a joint capable of unusually long life. Furthermore, the combination of screw threaded and bearing surface engagement of the joint components provides a joint which due to its bearing surfaces is highly resistant to conical deflection and, yet, due to its threaded construction operates at a lower and more constant torque than a joint in which only bearings are employed.

The above and other objects, features and advantages of the invention will be apparent from the following detailed description of a preferred embodiment of the invention and from the accompanying drawings wherein:

FIGURE 1 is a top plan view of an idler arm and center link assembly including the joint by which the idler arm and center link are interconnected and the joint assembly by which the idler arm can be pivotally connected to the vehicle frame or other structure on the vehicle; and FIGURE 2 is an elevational view partly in cross-section taken generally on the line 2—2 of FIGURE 1.

Referring now to the drawing, an idler arm 10 has one end which is connected with a cross or center link member 12 by means of a bolt or stud 14 which is provided at one end with threads 16. Stud 14 is press fitted into opening 18 of member 12 and extends through opening 20 of idler arm 10 whereby the several parts are retained in assembled relation by a nut 22 threaded on the stud and secured by a cotter pin 24 entered through a suitable transverse hole in the stud. To facilitate pivotal movement as between the idler arm and center link, a bushing 26, preferably made of a plastic material of the self lubricating type such as nylon or polytetrafluoroethylene, is press fitted in idler arm opening 20 and has a cylindrical inner diameter wall 26a which rotates on the peripheral surface of stud 14 upon longitudinal movement of the center link. A washer 28 is seated on the upper surface of bushing 26 and a combination annular seal and preload control member 30 is disposed between the idler arm 10 and center link 12. Member 30 which is composed of a relatively rigid plastic material capable of limited deformation, such as polyurethane, has a sleeve portion 30a and an out turned radial flange portion 30b. Sleeve portion 30a extends upwardly into idler arm opening 20 so as to abut bushing 26 and provide additional bearing surface for stud member 14, and flange portion 30b seats against the center link and is provided with an annular groove 30c. It will thus be seen that the resistance to rotation as between idler arm 10 and center link 12 can be controlled by adjusting the axial load imparted to the stud by nut 22. However, member 30 determines the degree of load since nut 22 can only be tightened onto the surface of washer 20 to the point where flange portion 30b is compressed so that the peripheral surface of groove 30c lies flat against center link 12. It is apparent of course that member 30 also functions as a seal about the lower end of opening 20. Similarly, foreign material is prevented from entering the upper portion of idler arm opening 20 by means of a suitable external seal 32 retained in position by a dish shaped washer 34.

Idler arm 10 is carried by the vehicle frame (not shown) and swings or pivots in a generally horizontal plane in response to longitudinal shifting of the center link 12. As seen in FIGURE 2, this pivotal movement is accommodated by the joint assembly of this invention, indicated generally by reference numeral 36, which comprises a socket portion and a stud or spindle portion. In the illustrated embodiment, the socket comprises a housing 38 which is pressed fit into an opening 40 extending through and generally normal to the longitudinal axis of the idler arm 10. It will be understood that the housing could be made integral with the idler arm if desired. Housing 38 is provided with a cylindrical, longitudinal extending bore which is open at one end and which comprises a diametrically reduced lower portion 42 and a diametrically enlarged or counterbored portion 44. The lower portion 42 of the bore is internally threaded and the juncture of these two bores forms an annular shoulder or seat 46.

The stud component of joint assembly 36 is provided with an upper bracket portion 48 having openings 50 by which the bracket can be attached to the frame or other structure on the automobile, and a lower cylindrical or spindle portion 52 which is partially threaded as at 54. The threads of spindle 52 are adapted to engage the threaded lower bore portion 42 so as to threadingly interconnect the stud with housing 38. In addition, spindle 52 is provided with a bearing surface or journal portion 56 which is adapted to be snugly received in the counterbored portion 44 of housing 38. In a preferred embodiment, a sleeve or bushing 58 is seated on shoulder 46 of housing 38. Bushing 58 is held in firm contact with the wall of counterbore 44 and is fabricated of a lubricating type of plastic, such as nylon, so that housing 38 will slide easily about the surface of the stud. Thus, bushing 58 functions as both a bearing surface and wear lining which, when worn, can be easily replaced with a new bushing so as to restore the desired precision of fit.

The bore in housing 38 defines a lower cavity portion 60 which is suitable for containing grease or other lubricants which may be packed therein at the time of original assembly of the joint or supplied thereto after assembly through a conventional lubricating fitting (not shown). In order to retain the lubricant in the joint and to prevent the entry of dirt or other foreign matter therewithin an external seal 62 is provided about the open end portion of housing 38. Seal 62, which may be fabricated from rubber or other flexible material, is retained in position by being compressed between housing 38 and a flange 64 extending radially outwardly from the stud.

With the construction of the joint assembly of the invention in mind, several important features will be recognized. Thus, the substantial amount of bearing surface renders the joint extremely resistant to loads which tend to cause conical deflection or, as seen in FIGURE 2, vertical movement of the idler arm which in turn would result in erratic movement of the center link. Moreover, due to such bearing surface the stress placed on the threads of the joint housing and stud is kept at a minimum thereby minimizing thread wear and providing for ease of rotation as between the joint components. Further, the joint assembly is of relatively simple construction, low cost and lends itself to so-called permanent lubrication. In addition, the threaded interconnection of joint components provides for a high degree of safety.

While the foregoing description presents a detailed disclosure of the preferred embodiment of this invention, it is to be understood that modifications and variations may be effected. Thus a reversal of parts is contemplated wherein the idler arm, for example, is provided with a spindle portion for insertion into a bore provided in the bracket member.

I claim:
1. A joint assembly for interconnecting first and second members, said joint assembly comprising a socket portion provided in one of said members and a spindle portion on the other of said members, said socket having a bore which is open at least at one end thereof and said spindle having axially spaced bearing and threaded portions, said bearing portion being of constant diameter and larger diameter than said threaded portion, said bore having a cylindrical portion which is at least partially threaded so as to receive said threaded portion of said spindle and a counterbored portion in communication with said cylindrical bore portion so as to form an annular shoulder, and a bushing seated on said annular shoulder said bushing providing a bearing surface in cooperation with said spindle bearing portion, said spindle being disposed in said socket so that the spindle bearing portion is journalled in said bore and the threaded portion of said bore is in threaded engagement with the threaded portion of said spindle.

2. A joint assembly for interconnecting first and second members, said joint assembly comprising a socket portion provided in one of said members and a spindle portion on the other of said members, said spindle having axially spaced bearing and threaded portions, said bearing and threaded portions being of different diameters, said socket having a cylindrical bore portion and a counterbore portion in communication with said cylindrical portion with both of said bore portions being of constant diameters, one of said bore portions being threaded and the other bore portion having an interior wall in engagement with the outer peripheral surface of a bushing, said bushing having a constant wall thickness and providing a bearing surface in cooperation with said spindle bearing portion, said bearing surface having an axial length at least as great as the axial length of the threaded portion of the bore, and said spindle being disposed in said socket so that the spindle bearing is journalled in said bore and the threaded portion of the bore is in threaded engagement with the threaded portion of said spindle.

References Cited

UNITED STATES PATENTS

| 3,307,888 | 3/1967 | Dumpis | 287—93 |
| 2,042,811 | 6/1936 | Taplin | 287—93 X |
| 2,689,756 | 9/1954 | Carlson | 308—120 X |
| 2,833,551 | 5/1958 | Dick | 280—95 |
| 2,853,327 | 9/1958 | Traugott | 280—95 X |
| 2,913,251 | 11/1959 | Herbenar | 280—96.1 |
| 3,039,786 | 6/1962 | Punches | 280—95 |
| 3,096,128 | 7/1963 | Wight. | |

KENNETH H. BETTS, *Primary Examiner.*

U.S. Cl. X.R.

308—120; 280—95